US010734185B2

(12) United States Patent
Yonezawa

(10) Patent No.: US 10,734,185 B2
(45) Date of Patent: Aug. 4, 2020

(54) ROTATING ANODE TYPE X-RAY TUBE

(71) Applicant: Canon Electron Tubes & Devices Co., Ltd., Otawara-shi (JP)

(72) Inventor: Tetsuya Yonezawa, Yaita (JP)

(73) Assignee: Canon Electron Tubes & Devices Co., Ltd., Otawara-shi (JP)

(*) Notice: Subject to any disclaimer, the term of this patent is extended or adjusted under 35 U.S.C. 154(b) by 370 days.

(21) Appl. No.: 15/649,053

(22) Filed: Jul. 13, 2017

(65) Prior Publication Data

US 2017/0309435 A1   Oct. 26, 2017

Related U.S. Application Data

(63) Continuation of application No. PCT/JP2015/080116, filed on Oct. 26, 2015.

(30) Foreign Application Priority Data

Jan. 16, 2015   (JP) .................. 2015-006833

(51) Int. Cl.
*H01J 35/10*   (2006.01)
*F16C 17/10*   (2006.01)

(52) U.S. Cl.
CPC .......... *H01J 35/101* (2013.01); *F16C 17/107* (2013.01); *H01J 35/10* (2013.01);
(Continued)

(58) Field of Classification Search
CPC ........ F16C 17/00; F16C 17/02; F16C 17/022; F16C 17/10; F16C 17/102; F16C 17/107;
(Continued)

(56) References Cited

U.S. PATENT DOCUMENTS 6,751,293 B1   6/2004   Barrett
2004/0234033 A1*  11/2004   Anno .................... F16C 17/026
378/133

FOREIGN PATENT DOCUMENTS

CN   1060557 A   4/1992
JP   6-70896   3/1994
(Continued)

OTHER PUBLICATIONS

International Search Report dated Dec. 15, 2015 in PCT/JP2015/080116 filed Oct. 26, 2015 (with English translation).
(Continued)

*Primary Examiner* — Anastasia Midkiff
(74) *Attorney, Agent, or Firm* — Oblon, McClelland, Maier & Neustadt, L.L.P.

(57) ABSTRACT

In one embodiment, a rotating anode type X-ray tube comprises a fixed shaft having a first surface, a rotor, a cathode emitting electrons, and an anode target. The rotor comprises a first cylinder having a second surface, a second cylinder, and a third cylinder. A first threaded portion on an inner surface of the first cylinder and a second threaded portion on an outer peripheral surface of the third cylinder are tightened. A screw member is screwed in a third threaded portion on an inner peripheral surface of a hole which penetrates the third cylinder, and a tip portion of the screw member presses the second cylinder against the second surface.

6 Claims, 4 Drawing Sheets

(52) U.S. Cl.
CPC ...... *F16C 2226/60* (2013.01); *F16C 2316/10* (2013.01); *F16C 2380/16* (2013.01); *H01J 2235/1006* (2013.01); *H01J 2235/106* (2013.01); *H01J 2235/1086* (2013.01)

(58) Field of Classification Search
CPC ...... F16C 41/00; F16C 41/02; F16C 2226/00; F16C 2226/50; F16C 2226/60; F16C 2226/62; F16C 2226/70; F16C 2300/00; F16C 2226/20; F16C 2226/22; F16C 2226/40; F16C 2226/54; F16C 2380/00; F16C 2380/16; H01J 35/00; H01J 35/08; H01J 35/083; H01J 35/086; H01J 35/10; H01J 35/1006; H01J 35/1013; H01J 35/1046; H01J 35/106; H01J 35/1093; H01J 2237/00; H01J 2237/03; H01J 2237/032; H01J 2237/036
See application file for complete search history.

(56) References Cited

FOREIGN PATENT DOCUMENTS

| | | |
|---|---|---|
| JP | 2004-349157 | 12/2004 |
| JP | 3703522 | 10/2005 |
| JP | 2009-283421 | 12/2009 |
| JP | 2012-84399 | 4/2012 |
| JP | 2014-160604 | 9/2014 |
| JP | 2016-9617 | 1/2016 |

OTHER PUBLICATIONS

Written Opinion dated Dec. 15, 2015 in PCT/JP2015/080116 filed Oct. 26, 2015.
Extended Search Report dated Aug. 21. 2018 in European Patent Application No. 15877924.9, 5 pages.
Combined Office Action and Search Report dated Aug. 30, 2018 in Chinese Patent Application No. 201580073314.7, 11 pages.

* cited by examiner

ROTATING ANODE TYPE X-RAY TUBE

CROSS-REFERENCE TO RELATED APPLICATIONS

This application is a Continuation Application of PCT Application No. PCT/JP2015/080116, filed Oct. 26, 2015 and based upon and claiming the benefit of priority from Japanese Patent Application No. 2015-006833, filed Jan. 16, 2015, the entire contents of all of which are incorporated herein by reference.

FIELD

Embodiments described herein relate generally to a rotating anode type X-ray tube.

BACKGROUND

Conventional medical devices and industrial devices photographing an object with X-rays have employed an X-ray tube assembly as an X-ray generation source. A rotating anode type X-ray tube assembly has been known as the X-ray tube assembly.

The rotating anode type X-ray tube assembly comprises a rotating anode type X-ray tube which emits X-rays, a stator coil, and a housing which accommodates the rotating anode type X-ray tube and the stator coil. The rotating anode type X-ray tube comprises a fixed shaft, a cathode which generates electrons, an anode target, a rotor, and a vacuum envelope. The rotor comprises a cylindrical portion and the like and is connected to the anode target. The rotor is supported to be freely rotatable to a rotation axis by bearings, and rotates with a magnetic field generated from the stator coil. As the electrons emitted from the cathode collide with the anode target, X-rays are emitted.

As the bearings, for example, dynamic pressure bearings using a lubricant with which a gap between the fixed shaft and the rotor are filled are used. If leakage of the lubricant occurs at employment of the bearings of this type, the lubricant may be short, the rotation speed of the rotor may become lower, and the rotor may be stopped.

DETAILED DESCRIPTION

Figure 1:
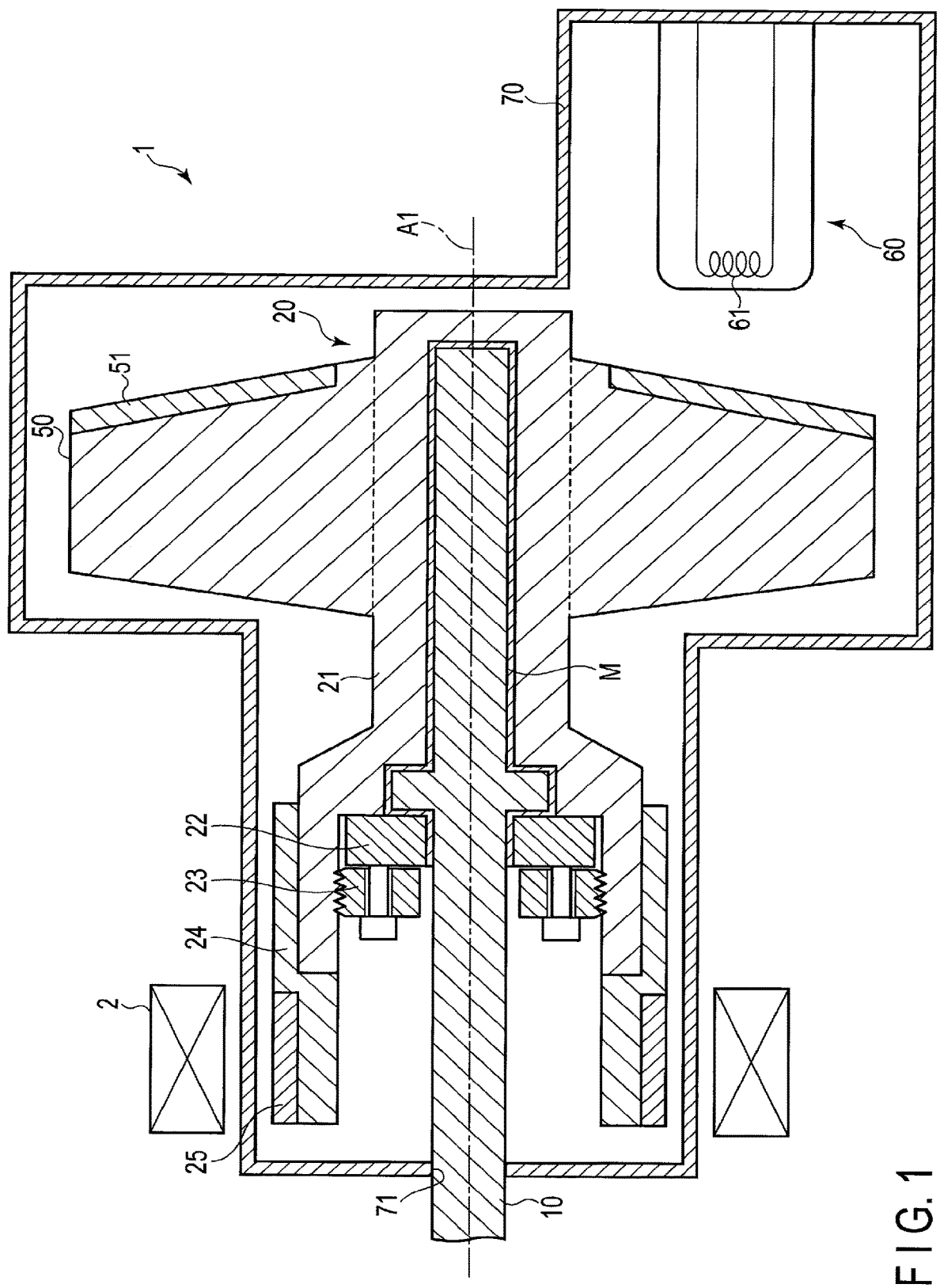
FIG. 1 is a cross-sectional view schematically showing a rotating anode type X-ray tube assembly according to a first embodiment.

In general, according to one embodiment, a rotating anode type X-ray tube comprises a fixed shaft having a first surface intersecting a direction parallel to a rotation axis, a rotor supported by dynamic pressure bearings including a lubricant put into a gap between the fixed shaft and the rotor to rotate about the rotation axis around the fixed shaft, a cathode emitting electrons, and an anode target provided at the rotor to generate X-rays by electrons emitted from the cathode colliding with the anode target. The rotor comprises a first cylinder having a second surface intersecting a direction parallel to the rotation axis, a second cylinder being in contact with the second surface and facing the first surface via the lubricant, and a third cylinder located on a side opposite to the first and second surfaces with the second cylinder sandwiched between the third cylinder and the first and second surfaces. A first threaded portion provided on an inner surface of the first cylinder and a second threaded portion provided on an outer peripheral surface of the third cylinder are tightened. A screw member is screwed in a third threaded portion provided on an inner peripheral surface of a hole which penetrates the third cylinder in the direction parallel to the rotation axis, and a tip portion of the screw member presses the second cylinder against the second surface.

The rotor may comprise a fourth cylinder connected to the first cylinder. The first threaded portion provided on the inner surface of the fourth cylinder and the second threaded portion provided on the outer peripheral surface of the third cylinder may be tightened.

According to above structures, the rotating anode type X-ray tube capable of extending its lifetime is provided.

Various embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

First Embodiment

FIG. 1 is a cross-sectional view schematically showing a rotating anode type X-ray tube assembly according to a first embodiment.

As illustrated in this drawing, the rotating anode type X-ray tube assembly comprises a rotating anode type X-ray tube 1, a stator coil 2 serving as a coil which generates a magnetic field, and the like. The rotating anode type X-ray tube 1 comprises a fixed shaft 10, a rotor 20, an anode target 50, a cathode 60, and a vacuum envelope 70.

In the example shown in FIG. 1, several parts of the fixed shaft 10, the rotor 20, the anode target 50, and the cathode 60 are accommodated in the vacuum envelope 70. The vacuum envelope 70 is hermetically sealed and is kept evacuated. The vacuum envelope 70 is formed of, for example, glass.

In the example shown in FIG. 1, one of ends of the fixed shaft 10 is located inside the vacuum envelope 70. The fixed shaft 10 extends to the outside of the vacuum envelope 70 through an opening 71 provided on the vacuum envelope 70. The fixed shaft 10 and the vacuum envelope 70 are airtightly connected to each other at the opening 71. A conduit for circulating a coolant may be formed inside the fixed shaft 10.

The rotor 20 is supported to be rotatable around the fixed shaft 10 by the bearings. The rotor 20 comprises a first cylinder 21, a second cylinder 22, a third cylinder 23, a fourth cylinder 24, and a fifth cylinder 25. The first cylinder 21, the second cylinder 22, the third cylinder 23, the fourth cylinder 24, and the fifth cylinder 25 are provided coaxially with an axis A1 (rotation axis) of the fixed shaft 10. For example, a cross-section in any direction along the rotation axis A1 has a shape of point symmetry with respect to the axis A1, in each of the fixed shaft 10, the first cylinder 21, the second cylinder 22, the third cylinder 23, the fourth cylinder 24, the fifth cylinder 25, and the anode target 50.

A small gap formed between the fixed shaft 10 and the rotor 20 is filled with a lubricant M. That is, the rotor 20 is rotatably supported with respect to the fixed shaft 10, by radial dynamic pressure bearings having a first radial bearing surface corresponding to the outer peripheral surface of the fixed shaft 10, a second radial bearing surface corresponding to the inner peripheral surface of the rotor 20, and the lubricant M. For example, a liquid metal can be used as the lubricant M. Furthermore, a GaIn (gallium indium) alloy or a GaInSn (gallium indium tin) alloy or the like can be used as this liquid metal. The liquid metal has a property of becoming liquid at ordinary temperatures. In addition, the liquid metal also has a property of having a low vapor pressure. For this reason, the liquid metal can be used inside the rotating anode type X-ray tube 1 in the evacuated state.

The anode target 50 is connected to the rotor 20. The anode target 50 is provided coaxially with the fixed shaft 10 and the like. The anode target 50 is formed in an annular shape and connected to the first cylinder 21. The anode target 50 is formed of a metal material such as heavy metal. As the metal material of the anode target 50, for example, a molybdenum alloy can be used. The anode target 50 is rotated integrally with the rotor 20.

The second cylinder 22, the third cylinder 23, the fourth cylinder 24, and the fifth cylinder 25 are formed of a metal material. As the metal material of the second cylinder 22, the third cylinder 23, and the fourth cylinder 24, for example, an iron alloy such as die steel can be used. As the metal material of the fifth cylinder 25, for example, copper can be used.

The anode target 50 has an annular X-ray emitting layer 51. To withstand high temperatures, the X-ray emitting layer 51 needs to be formed of a metal material having a high melting point. As the metal material of the X-ray emitting layer 51, for example, a tungsten alloy can be used.

The cathode 60 is disposed to face the X-ray emitting layer 51 on the anode target 50. In the example shown in FIG. 1, the cathode 60 is attached to an inner wall of the vacuum envelope 70. The cathode 60 comprises a filament 61 for emitting electrons.

In the present embodiment, the anode target 50 is integrally formed of the same material as that of the first cylinder 21. The anode target 50 may be bonded to a side surface of the first cylinder 21. In this case, the first cylinder 21 and the anode target 50 may be formed of the same material or may be formed of materials different from each other. The shape of the anode target 50 in the present embodiment is a mere example, and various shapes such as a disk shape can be adopted as the anode target 50.

The stator coil 2 is provided to face the fifth cylinder 25 and annularly surround the outside of the vacuum envelope 70.

In the operation of the rotating anode type X-ray tube assembly, the stator coil 2 generates a magnetic field to be applied to the fifth cylinder 25. The rotor 20 thereby rotates about the axis A1 together with the anode target 50. In addition, a relatively negative voltage is applied to the cathode 60, a relatively positive voltage is applied to the anode target 50, and a potential difference is generated between the cathode 60 and the anode target 50. The electrons emitted from the filament 61 are accelerated toward the anode target 50 and collide with the X-ray emitting layer 51. The X-rays generated from the X-ray emitting layer 51 thereby pass through the vacuum envelope 70 and are emitted to the outside of the vacuum envelope 70.

Figure 2:
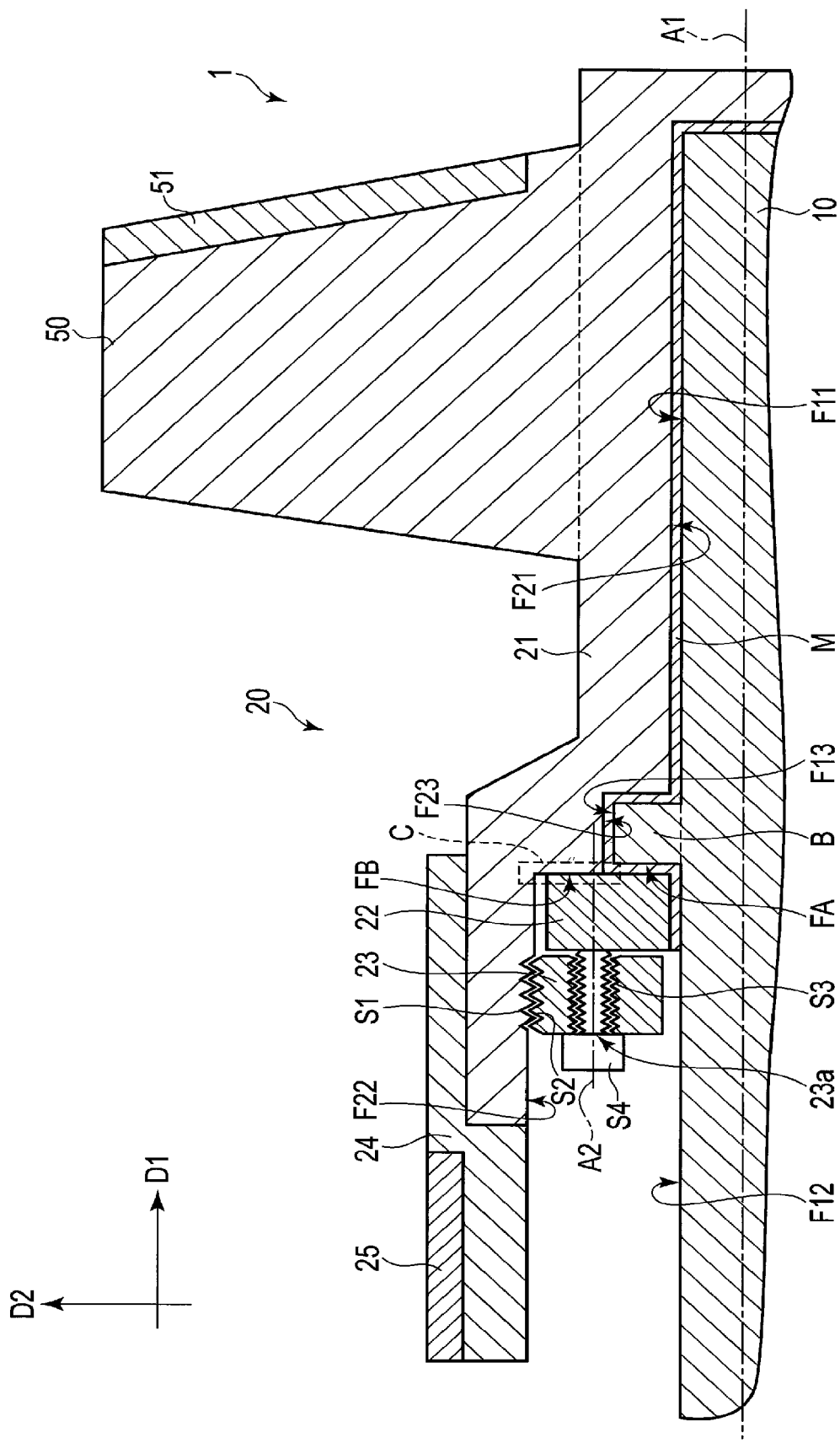
FIG. 2 is a cross-sectional view schematically showing several parts of the rotating anode type X-ray tube assembly shown in FIG. 1.

FIG. 2 is a cross-sectional view schematically showing several parts of the rotating anode type X-ray tube assembly shown in FIG. 1.

The fixed shaft 10 has a first outer peripheral surface F11 and a second outer peripheral surface F12. In the example shown in FIG. 2, a diameter of the first outer peripheral surface F11 and a diameter of the second outer peripheral surface F12 are substantially the same as each other, but these diameters may be different from each other.

Furthermore, the fixed shaft 10 has an annular flange portion B protruding in a radial direction D2 perpendicularly intersecting the thrust direction D1 parallel to the axis A1, between the first outer peripheral surface F11 and the second outer peripheral surface F12. The diameter of the third outer peripheral surface F13 which is the front end surface of the flange portion B in the radial direction D2 is larger than the diameter of the first outer peripheral surface F11 and the second outer peripheral surface F12. The first outer peripheral surface F11, the second outer peripheral surface F12, and the third outer peripheral surface F13 are surfaces parallel to the thrust direction D1.

The first outer peripheral surface F11, the second outer peripheral surface F12, and the third outer peripheral surface F13 are formed on, for example, the fixed shaft 10 integrally formed of the same material throughout the entire body. However, the fixed shaft 10 may be formed by combining parts corresponding to the first outer peripheral surface F11, the second outer peripheral surface F12, and the third outer peripheral surface F13 with the outer peripheral surfaces, respectively.

Furthermore, the fixed shaft 10 has a first surface FA intersecting the thrust direction D1. In the example shown in FIG. 2, the first surface FA is an annular face connecting the second outer peripheral face F12 with the third outer peripheral face F13 and is parallel to the radial direction D2.

The first cylinder 21 has a first inner peripheral surface F21, a second inner peripheral surface F22, and a third inner peripheral surface F23. The first inner peripheral surface F21, the second inner peripheral surface F22, and the third inner peripheral surface F23 are surfaces parallel to the thrust direction D1. The first inner peripheral surface F21 has a diameter slightly larger than the first outer peripheral surface F11 and faces the first outer peripheral surface F11 via the lubricant M. The second inner peripheral surface F22 has a diameter larger than the diameters of the second outer peripheral surface F12 and the first inner peripheral surface F21 and faces the second outer peripheral surface F12. The third inner peripheral surface F23 has a diameter larger than the diameter of the third outer peripheral surface F13 and the first inner peripheral surface F21 and smaller than the diameter of the second inner peripheral surface F22 and is opposed to the third outer peripheral surface F13.

Furthermore, the first cylinder 21 has a second surface FB intersecting the thrust direction D1. In the example shown in FIG. 2, the second surface FB is an annular surface connecting the second inner peripheral surface F22 with the third inner peripheral surface F23 and is parallel to the radial direction D2.

The second cylinder 22 and the third cylinder 23 are arranged between the second outer peripheral surface F12 and the second inner peripheral surface F22. One of surfaces of the second cylinder 22 in the thrust direction D1 is in contact with the second surface FB.

A slight gap is formed between the inner peripheral surface of the second cylinder 22 and the second outer peripheral surface F12 and between the surface of the second cylinder 22 on the contact side with the second surface FB and the first surface FA and is filled with the lubricant M. The inner peripheral surface of the second cylinder 22 faces the second outer peripheral surface F12 via the lubricant M, and the surface of the second cylinder 22 on the contact side with the second surface FB faces the first surface FA.

A first threaded portion S1 is formed on the second inner peripheral surface F22. On the outer peripheral surface of the third cylinder 23, a second threaded portion S2 having a thread pitch and an effective diameter equivalent to the thread pitch and the effective diameter of the first threaded portion S1 is formed. The first threaded portion S1 is a female thread, and the second threaded portion S2 is a male thread. The third cylinder 23 is fixed to the first cylinder 21 by tightening the first threaded portion S1 and the second threaded portion S2. To insert the third cylinder 23 to the position where the first threaded portion S1 is provided and tighten the first threaded portion S1 and the second threaded portion S2, the diameter of the first region on the second surface FB side from the first threaded portion S1 is slightly different from the diameter of the second region located on the opposite side of the first region beyond the first threaded portion S1. The diameter of the first region is slightly smaller than the diameter of the second region.

In the example shown in FIG. 2, the second threaded portion S2 is formed over the substantially entire outer peripheral surface of the third cylinder 23. However, the second screw portion S2 may be formed on a part of the outer peripheral surface of the third cylinder 23.

The third cylinder 23 has a plurality of holes 23a penetrating in the thrust direction D1. A third threaded portions S3 is formed on the inner peripheral surface of each of the holes 23a. Each of the third threaded portions S3 is a female thread. For example, the third screw portions S3 are formed at every certain angle around the axis A1. A screw member S4 having a thread pitch and an effective diameter equivalent to the thread pitch and the effective diameter of the third threaded portion S3 is screwed into each of the third threaded portions S3 from the opposite side of the second cylinder 22. Each screw member S4 is a male screw provided with a head portion having a diameter larger than the diameter of the hole 23a. The head portion of each screw member S4 is in contact with the surface of the third cylinder 23 on the side opposite to the second cylinder 22. Distal end portions of the screw members S4 protrude from the surface of the third cylinder 23 on the second cylinder 22 side through the respective holes 23a and are in contact with the second cylinder 22. The axis A2 of the screw member S4 (or the axis of the hole 23a) is parallel to the axis A1, and a contact portion C of the second cylinder 22 and the second surface FB is located in the extension of the axis A2. A gap is formed between the second cylinder 22 and the third cylinder 23 as shown in, for example, FIG. 2.

The fourth cylinder 24 is fixed in a state in which its inner peripheral surface is fitted to the outer peripheral surface of the first cylinder 21. The fifth cylinder 25 is fixed in a state in which its inner peripheral surface is fitted to the outer peripheral surface of the fourth cylinder 24. As a technique of fixing the fourth cylinder 24 and the first cylinder 21 and fixing the fifth cylinder 25 and the fourth cylinder 24, for example, cooling fit of cooling and contracting a cylinder positioned inside, of two cylinders, and fitting the cylinder into a cylinder positioned outside, shrinkage fit of heating and expanding a cylinder positioned outside, of two cylinders, and fitting the cylinder into a cylinder positioned inside, press fit of pressing a cylinder positioned inside, of two cylinders, into a cylinder positioned inside, and the like can be employed. In addition, welding, brazing, caulking, threaded connection, pinning, or the like can be employed as the fixing method. When the threaded connection is employed, the inner wall of the outer cylinder of two cylinders is handled as a female thread, the outer wall of the inner cylinder is handled as a male thread, and the female thread and the male thread are screwed together.

In the rotating anode type X-ray tube 1 having the above-described configuration, a force to push the second cylinder 22 in the thrust direction D1 by the tip of each screw member S4 works by screwing the screw members S4 to the plurality of third threaded portions S3, respectively. Thus, the second cylinder 22 is pressed against the second surface FB, and the second cylinder 22 and the second surface FB can be brought into contact with each other over the entire circumference without any gap. The force to push the second cylinder 22 in the thrust direction D1 can be adjusted by varying the amount of screwing each screw member S4 into the third threaded portion S3. A partial contact between the second cylinder 22 and the second surface FB can be prevented by such adjustment.

If the second cylinder 22 is fixed to the first cylinder 21 by the other method, for example, tightening a threaded portion provided on the inner peripheral surface of the first cylinder 21 and a threaded portion provided on the outer peripheral surface of the second cylinder 22, a sufficient force to press the second cylinder 22 against the second surface FB in the thrust direction D1 can hardly be obtained. To bring the second cylinder 22 and the second surface FB into close contact with each other, the axis of the threaded portion and the second surface FB need to be perfectly perpendicular to each other, but their processing is difficult. As a result, the seal of the lubricant M becomes insufficient, and the lubricant M may leak from between the second cylinder 22 and the second surface FB or the like.

If the lubricant M leaks, there is a possibility that the rotation speed of the anode target 50 may be lowered or the anode target 50 may be stopped due to a decrease in function of the dynamic pressure bearings caused by lack of the lubricant. Since electrons from the cathode 60 continuously collide with the same position of the anode target 50 in a state in which the anode target 50 is stopped, the temperature of the anode target 50 becomes high and the anode target 50 may be molten and discharge may occur.

In contrast, a sufficient force to press the second cylinder 22 against the second face FB in the thrust direction D1 can be applied by the plurality of screw members S4, in the rotary anode type X-ray tube 1 according to the present embodiment. In addition, since the second cylinder 22 itself does not utilize screw tightening or the like, the second cylinder 22 and the second face FB can be brought into contact with each other on the entire surface without being subjected to processing limitations. Therefore, the second cylinder 22 and the second surface FB are brought into close contact with each other, and the lubricant M can be sufficiently sealed. A longer life of the rotating anode type X-ray tube 1 can be achieved by thus preventing the leakage of the lubricant M.

In addition, various preferable effects can be obtained from the configuration disclosed in the present embodiment.

Second Embodiment

The second embodiment will be explained. Constituent elements which are the same as or similar to those of the first embodiment are denoted by the same reference numerals, and duplicate explanations are omitted as needed.

Figure 3:
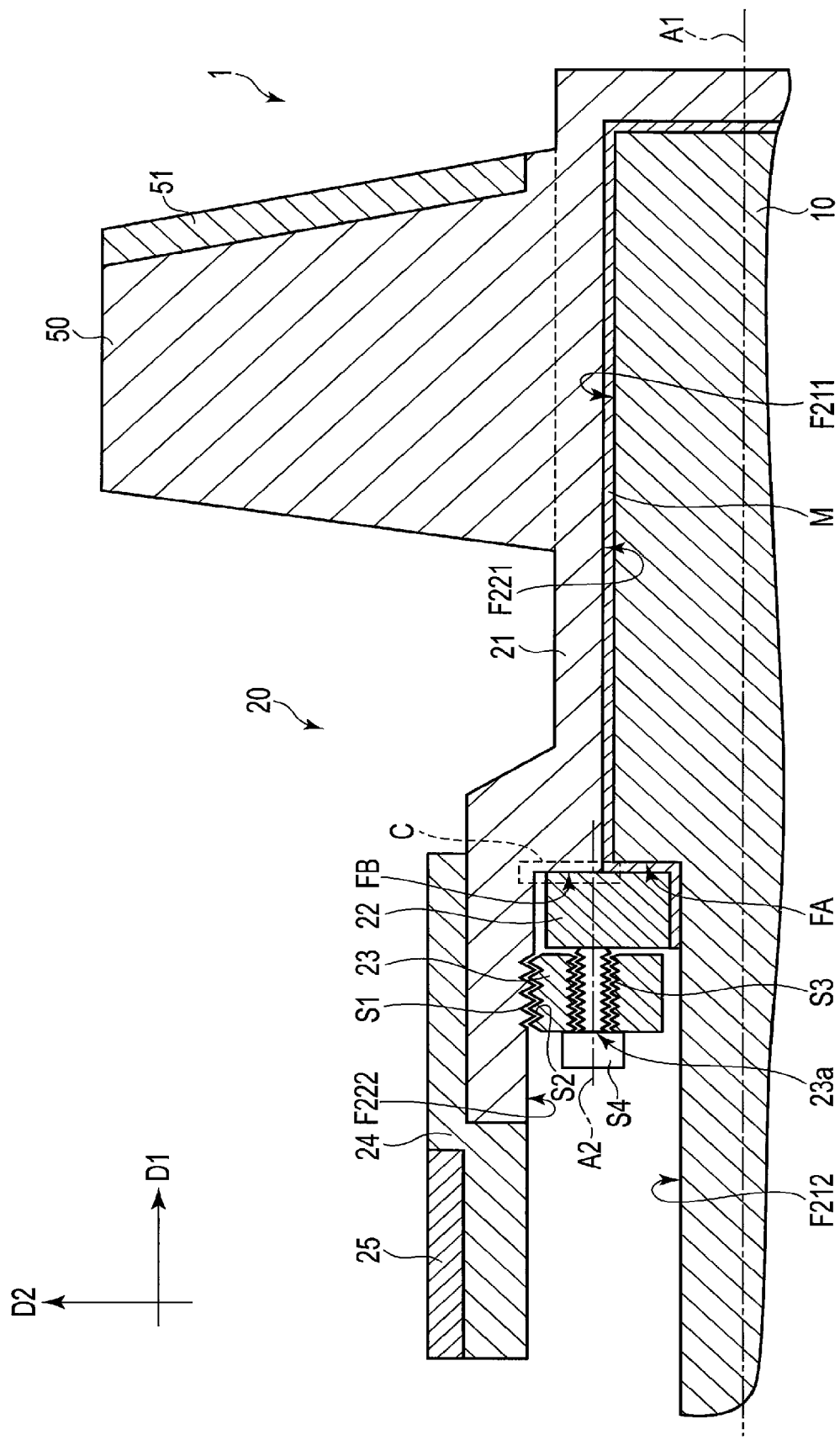
FIG. 3 is a cross-sectional view schematically showing several parts of a rotating anode type X-ray tube assembly according to a second embodiment.

FIG. 3 is a cross-sectional view schematically showing several parts of a rotating anode type X-ray tube assembly according to the present embodiment.

A rotating anode type X-ray tube 1 shown in this drawing is different from the first embodiment with respect to features that a fixed shaft 10 has a first outer peripheral surface F211 and a second outer peripheral surface F212, and that a first cylinder 21 has a first inner peripheral surface F221 and a second inner peripheral surface F222. The first outer peripheral surface F211, the second outer peripheral surface F212, the first inner peripheral surface F221, and the second inner peripheral surface F222 are surfaces parallel to the thrust direction D1.

The first outer peripheral surface F211 extends along the thrust direction D1 from the tip of the fixed shaft 10 on an anode target 50 side. The first outer peripheral surface F211 has approximately the same diameter as the third outer peripheral surface F13 in the first embodiment, which corresponds to a diameter obtained by setting the diameter of the first outer peripheral surface F11 in the first embodiment to be the same as the diameter of the third outer peripheral surface F13. The second outer peripheral surface F212 has a diameter smaller than the first outer peripheral surface F211 and has the same function as the second outer peripheral surface F12 in the first embodiment.

The first inner peripheral surface F221 has approximately the same diameter as the third inner peripheral surface F23 in the first embodiment, which corresponds to a diameter obtained by setting the diameter of the first inner peripheral surface F21 in the first embodiment to be the same as the third inner peripheral surface F23. The second inner peripheral surface F222 has a diameter larger than the first inner peripheral surface F221 and is equipped with the first threaded portion S1 and has the same function as the second inner peripheral surface F22 in the first embodiment.

To insert the third cylinder 23 to the position where the first threaded portion S1 is provided and tighten the first threaded portion S1 and the second threaded portion S2, the diameter of the first region on the second surface FB side from the first threaded portion S1 is slightly different from the diameter of the second region located on the opposite side of the first region beyond the first threaded portion S1, on the second inner peripheral surface F222. The diameter of the first region is slightly smaller than the diameter of the second region.

In the present embodiment, a first surface FA is an annular surface connecting the first outer peripheral face F211 and the second outer peripheral face F212 and is parallel to the radial direction D2. In addition, in the present embodiment, the second surface FB is an annular surface connecting the first inner peripheral surface F221 and the second inner peripheral surface F222 and is parallel to the radial direction D2.

Even in the rotating anode type X-ray tube 1 having the above-described configuration, a force to push the second cylinder 22 in the thrust direction D1 by the tip of the screw member S4 works by screwing the screw members S4 to the plurality of third screw portions S3, respectively, similarly to the first embodiment. Thus, the second cylinder 22 is pressed against the second surface FB, and the second cylinder 22 and the second surface FB can be brought into contact with each other over the entire circumference without any gap.

In addition, since the shapes of the outer peripheral surface of the fixed shaft 10 and the inner peripheral surface of the first cylinder 21 are simpler than those of the first embodiment, their processing becomes easy.

Furthermore, the same advantages as those of the first embodiment can be obtained.

Third Embodiment

The third embodiment will be explained. Constituent elements which are the same as or similar to those of the first embodiment are denoted by the same reference numerals, and duplicate explanations are omitted as needed.

Figure 4:
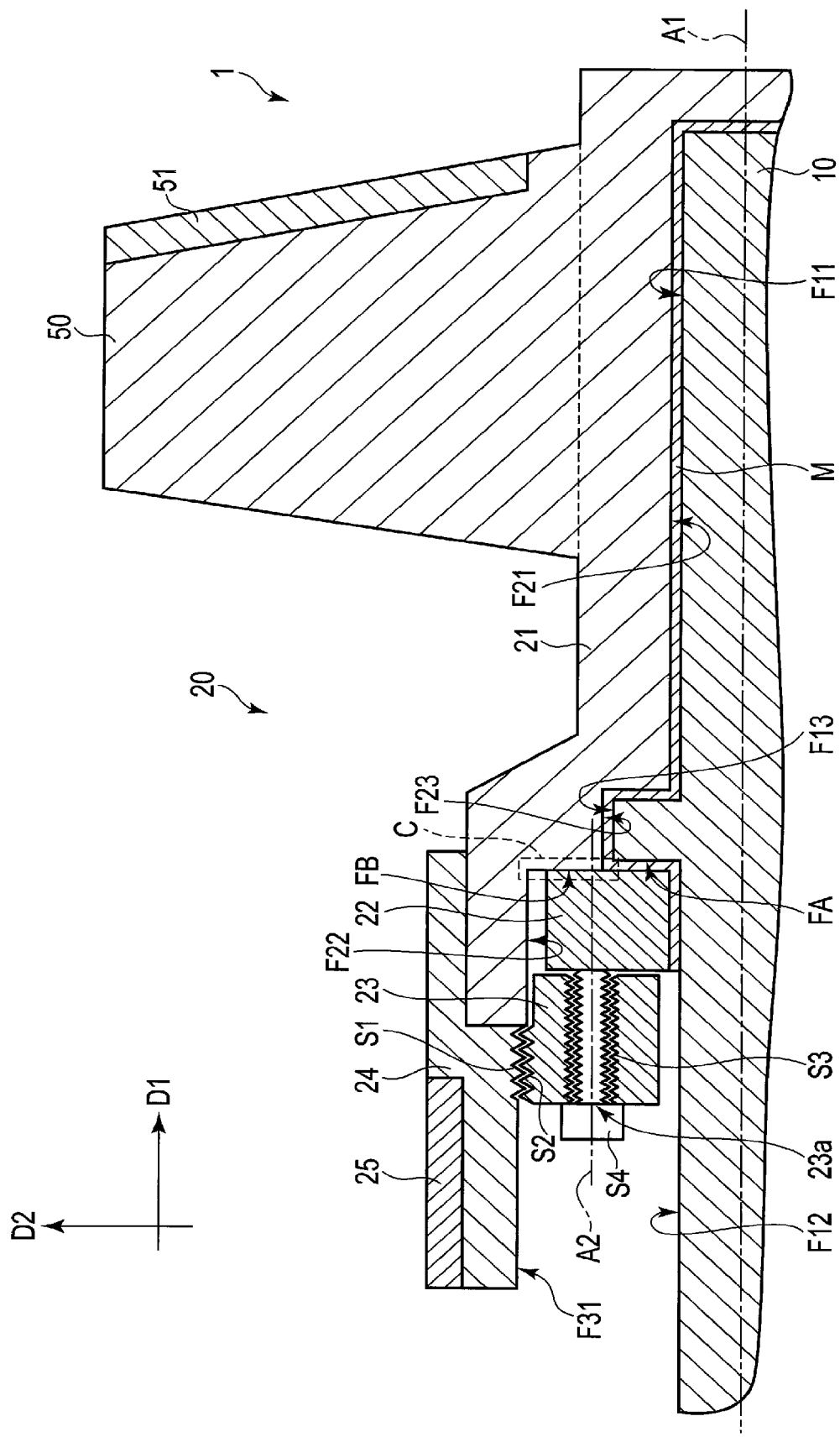
FIG. 4 is a cross-sectional view schematically showing several parts of a rotating anode type X-ray tube assembly according to a third embodiment.

FIG. 4 is a cross-sectional view schematically showing several parts of a rotating anode type X-ray tube assembly according to the present embodiment.

The rotating anode type X-ray tube 1 shown in this drawing is different from the first embodiment, mainly with respect to a feature that a first threaded portion S1 is provided not on a second inner peripheral face F22 of a first cylinder 21 but on an inner peripheral face F31 of a fourth cylinder 24. In the example shown in FIG. 4, the first screw portion S1 is formed at a position close to the first cylinder 21 on the inner peripheral surface F31.

An outer peripheral surface of a third cylinder 23 faces the second inner peripheral surface S22 of the first cylinder 21 and the inner peripheral surface F31 of the fourth cylinder 24. A second threaded portion S2 is formed in a region facing the inner peripheral surface F31 on the outer peripheral surface of the third cylinder 23. The third cylinder 23 is fixed to the fourth cylinder 24 by tightening the first threaded portion S1 and the second threaded portion S2. Since the fourth cylinder 24 is fixed to the first cylinder 21, the third cylinder 23 is also fixed to the first cylinder 21 by this tightening.

Even in the rotating anode type X-ray tube 1 having the above-described configuration, a force to push the second cylinder 22 in the thrust direction D1 by the tip of the screw member S4 works by screwing the screw members S4 to the plurality of third screw portions S3, respectively, similarly to the first embodiment. Thus, the second cylinder 22 is pressed against the second surface FB, and the second cylinder 22 and the second surface FB can be brought into contact with each other over the entire circumference without any gap.

Furthermore, the same advantages as those of the first embodiment can be obtained.

The embodiments of the present invention are not limited to the above-described rotating anode type X-ray tube 1 and the rotating anode type X-ray tube assembly, but are applicable to various types of rotating anode type X-ray tubes and rotating anode type X-ray tube assemblies.

For example, the rotating anode type X-ray tube and the rotating anode type X-ray tube assembly comprise the fixed shaft 10 and the first cylinder 21 disclosed in the second embodiment, the first threaded portion S1 is formed in the cylinder 24 as disclosed in the third embodiment, and the third cylinder 23 may be fixed to the fourth cylinder 24 by tightening the first threaded portion S1 and the second threaded portion S2 formed on the outer peripheral surface of the third cylinder 23.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rotating anode type X-ray tube, comprising:
a fixed shaft having a first surface intersecting a direction parallel to a rotation axis;
a rotor supported by dynamic pressure bearings including a lubricant put into a gap between the fixed shaft and the rotor to rotate about the rotation axis around the fixed shaft;
a cathode emitting electrons; and
an anode target provided at the rotor to generate X-rays by electrons emitted from the cathode colliding with the anode target,
wherein
the rotor comprises:
 a first cylinder having a second surface intersecting a direction parallel to the rotation axis;
 a second cylinder being in contact with the second surface and facing the first surface via the lubricant; and
 a third cylinder facing the second cylinder, the second cylinder being located between the third cylinder and the first and second surfaces,
a first threaded portion is provided on an inner surface of the first cylinder,
a second threaded portion is provided on an outer peripheral surface of the third cylinder,
the second threaded portion is screwed into the first threaded portion, and
a screw member is screwed in a third threaded portion provided on an inner peripheral surface of a hole which penetrates the third cylinder in the direction parallel to the rotation axis, and a tip portion of the screw member presses the second cylinder against the second surface.

2. The rotating anode type X-ray tube of claim 1, wherein
the fixed shaft has a first outer peripheral surface, a second outer peripheral surface, and a third outer peripheral surface,
the third outer peripheral surface is provided between the first outer peripheral surface and the second outer peripheral surface,
the third outer peripheral surface has a diameter larger than each of the first outer peripheral surface and the second outer peripheral surface,
the first cylinder has a first inner peripheral surface facing the first outer peripheral surface, a second inner peripheral surface having a diameter larger than the first inner peripheral surface and provided with the first threaded portion, and a third inner peripheral surface which has a diameter larger than the first inner peripheral surface and smaller than the second inner peripheral surface,
the third inner peripheral surface faces the third outer peripheral surface, and
the first surface includes a surface connecting the second outer peripheral surface with the third outer peripheral surface, and the second surface includes a surface connecting the second inner peripheral surface with the third inner peripheral surface.

3. The rotating anode type X-ray tube of claim 1, wherein
the fixed shaft has a first outer peripheral surface extending from a tip of the fixed shaft, and a second outer peripheral surface having a diameter smaller than the first outer peripheral surface,
the first cylinder has a first inner peripheral surface facing the first outer peripheral surface via the lubricant, and a second inner peripheral surface having a diameter larger than the first inner peripheral surface,
the first threaded portion is provided on the second inner peripheral surface, and
the first surface includes a surface connecting the first outer peripheral surface with the second outer peripheral surface, and the second surface includes a surface connecting the first inner peripheral surface with the second inner peripheral surface.

4. A rotating anode type X-ray tube, comprising:
a fixed shaft having a first surface intersecting a direction parallel to a rotation axis;
a rotor supported by dynamic pressure bearings including a lubricant put into a gap between the fixed shaft and the rotor to rotate about the rotation axis around the fixed shaft;
a cathode emitting electrons; and
an anode target provided at the rotor to generate X-rays by electrons emitted from the cathode colliding with the anode target,
wherein
the rotor comprises:
 a first cylinder having a second surface intersecting a direction parallel to the rotation axis;
 a second cylinder being in contact with the second surface and facing the first surface via the lubricant;
 a third cylinder facing the second cylinder, the second cylinder being located between the third cylinder and the first and second surfaces; and
 a fourth cylinder connected to the first cylinder,
a first threaded portion is provided on an inner surface of the fourth cylinder,
a second threaded portion is provided on an outer peripheral surface of the third cylinder,
the second threaded portion is screwed into the first threaded portion, and
a screw member is screwed in a third threaded portion provided on an inner peripheral surface of a hole which penetrates the third cylinder in the direction parallel to the rotation axis, and a tip portion of the screw member presses the second cylinder against the second surface.

5. The rotating anode type X-ray tube of claim 4, wherein
the fixed shaft has a first outer peripheral surface, a second outer peripheral surface, and a third outer peripheral surface,
the third outer peripheral surface is provided between the first outer peripheral surface and the second outer peripheral surface,
the third outer peripheral surface has a diameter larger than each of the first outer peripheral surface and the second outer peripheral surface,
the first cylinder has a first inner peripheral surface facing the first outer peripheral surface, a second inner peripheral surface having a diameter larger than the first inner peripheral surface and provided with the first threaded portion, and a third inner peripheral surface which has a diameter larger than the first inner peripheral surface and smaller than the second inner peripheral surface, the third inner peripheral surface faces the third outer peripheral surface, and the first surface includes a surface connecting the second outer peripheral surface with the third outer peripheral surface, and the second surface includes a surface connecting the second inner peripheral surface with the third inner peripheral surface.

6. The rotating anode type X-ray tube of claim 4, wherein the fixed shaft has a first outer peripheral surface extending from a tip of the fixed shaft, and a second outer peripheral surface having a diameter smaller than the first outer peripheral surface, the first cylinder has a first inner peripheral surface facing the first outer peripheral surface via the lubricant, and a second inner peripheral surface having a diameter larger than the first inner peripheral surface, the first threaded portion is provided on the second inner peripheral surface, and the first surface includes a surface connecting the first outer peripheral surface with the second outer peripheral surface, and the second surface includes a surface connecting the first inner peripheral surface with the second inner peripheral surface.

\* \* \* \* \*